(No Model.)

C. C. HORTON.
CLOTHES LINE FASTENER.

No. 559,893.  Patented May 12, 1896.

Witnesses
F. L. Ourand.
A. G. Heylmun

Inventor
Charles C. Horton
by J. M. Yznaga, Attorney

UNITED STATES PATENT OFFICE.

CHARLES C. HORTON, OF MINNEAPOLIS, MINNESOTA, ASSIGNOR OF ONE-HALF TO JOSEPH L. DOBBIN, OF SAME PLACE.

CLOTHES-LINE FASTENER.

SPECIFICATION forming part of Letters Patent No. 559,893, dated May 12, 1896.

Application filed February 21, 1896. Serial No. 580,160. (No model.)

*To all whom it may concern:*

Be it known that I, CHARLES C. HORTON, a citizen of the United States, residing at Minneapolis, in the county of Hennepin and State of Minnesota, have invented certain new and useful Improvements in Clothes-Line Fasteners; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to improvements in clothes-line fasteners; and the object is to provide a simple, efficient, and cheap fastener of the kind named and for the purposes intended in which, or to which, a clothes-line may be readily and conveniently arranged, clamped, and held, and as expeditiously released and detached.

I have fully and clearly illustrated my invention in the accompanying drawings, forming a part of this specification, and wherein—

Figure 1:
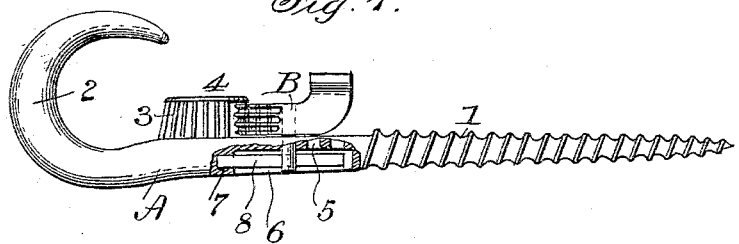
Figure 2:
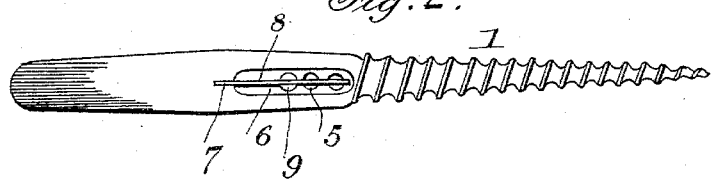

Figure 1 is a side view of my improved clothes-line fastener complete. Fig. 2 is a bottom plan view thereof.

A designates the body of the device, consisting of a proper piece of metal formed with a pointed or tapering shank 1, provided with screw-threads to make it easily and expeditiously inserted in a post or other suitable support and so it will be held securely therein. The end of the shank is turned up into a hook 2, so that another line may be engaged therein whenever it is desired to do so, and thus an extra line to that which is clamped in the device may be attached thereto and the lines thereof directed in any direction desired. On the bar or shank of the device is formed or secured a stud 3, milled or serrated in its vertical faces and formed with an annular flange 4 at its upper edge to lap over the adjacent upper face of the clamping piece or lever, substantially as shown in the drawings, to hold the end of the clamping-lever from upward movement or displacement. This stud 3 may be formed integral with the shank or otherwise made rigid therewith, or it may be made rotary thereon.

B designates a clamping-lever pivotally secured on the shank of the device and having its engaging end milled or serrated to make a better hold on the clothes-line. This clamping-lever may be of any suitable form and of such length as may be required to suit it to the purposes intended. The clamping-lever is fulcrumed on a suitable fulcrum-pin let through the body of the device and made adjustable by a series of holes 5, through which the fulcrum-pin may be inserted as desired, so as to place the end of the lever to grasp or clamp any-sized rope to which it is to be applied. To automatically return the clamping-lever to its normal position on the body of the device, I form a recess 6 in the under face thereof, and in a slit 7, extending into the material, as shown, a spring 8 is secured, the spring end thereof being adjustably or slidingly disposed in a slit 9 in the projecting end of the fulcrum-pin of the lever.

The application or use of my invention is apparent from the foregoing description, taken in connection with the drawings, and may be stated as follows: The shank of the hooked body is screwed or driven into the support and then the device is ready for use, and a line may be applied therein by simply inserting the line from the proper direction between the clamps and pulling thereon until the desired tension has been made, when by releasing the pull on the line the return resiliency thereof causes the clamps to be brought into operation, and the clamp is effected and the line held securely thereby. To release the line, the clamping-lever may be moved from its position by manipulation, or the free end of the line pulled on until the clamps are separated, and then by holding the clamping-lever free from contact with the line the latter may be run freely out until the end is free from the device.

Having thus described my invention, what I claim, and desire to secure by Letters Patent, is—

1. A clothes-line fastener, comprising the body-piece having a screw-threaded shank and a hook-formed outer end and a stud on the body-piece formed with a flange at its upper front edge, and a clamping-lever fulcrumed on the body-piece to set with its clamping end under the flange on said stud on the body.

2. A clothes-line fastener comprising the body-piece having a screw-threaded pointed shank and a hook-formed outer end, and a stud on the body formed with a flange on its upper edge, a lever fulcrumed on the body-piece to set with its clamping end under the flange of said stud, and a spring secured in the under side of the body-piece and having its end adjustably secured in the fulcrum-pin of the clamping-lever.

In testimony whereof I affix my signature in presence of two witnesses.

CHARLES C. HORTON.

Witnesses:
LULU E. GRAY,
J. L. DOBBIN.